United States Patent Office 3,129,916
Patented Apr. 21, 1964

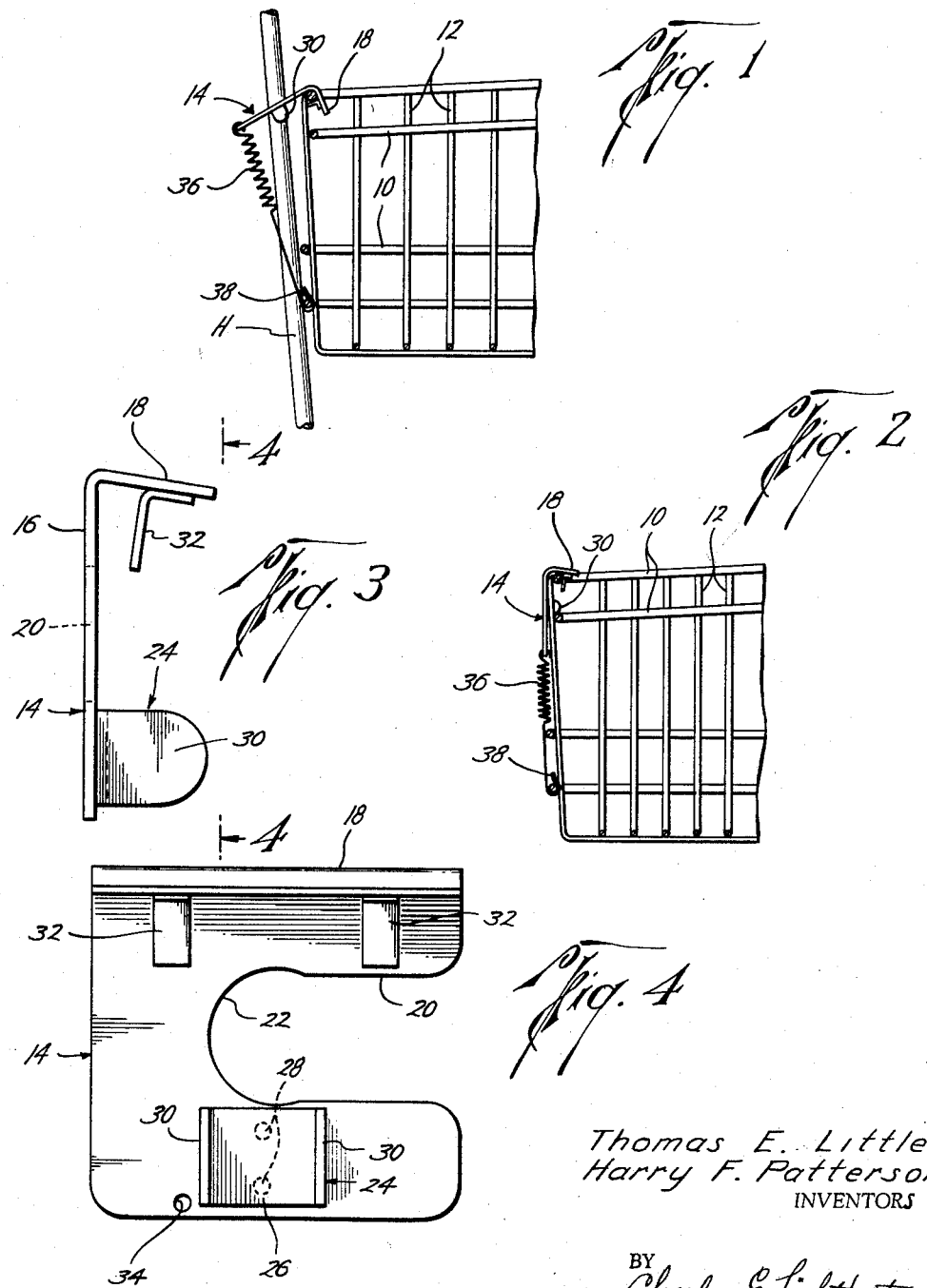

3,129,916
HANDLED IMPLEMENT HOLDER FOR
SHOPPING CARTS
Harry F. Patterson, 1731 Stonecrest St., Houston 18, Tex., and Thomas E. Little, 2610 Nicholson, Houston 8, Tex.
Filed Mar. 30, 1962, Ser. No. 183,971
4 Claims. (Cl. 248—113)

This invention relates to implement holders, and more particularly to a holding device for use on shopping carts or similar equipment for releasably holding a long handled implement, such as a broom or mop in an upright position on the cart.

Shopping carts, such as those used in super-markets, serve-yourself grocery stores, and similar places, are usually of basket-like construction, mounted on wheels to be easily moved about in aisles and between counters or among stacks of merchandise for use by customers in selecting purchases. Carts of this kind are customarily constructed to be nested horizontally, one within another, so that a large number of them may be compactly arranged for easy access and to occupy a minimum of floor space when not in use. Such carts do not lend themselves well to the carrying of relatively long articles, such as brooms, mops, or the like, since there is no way in which such articles can be readily held in an upright position thereon, and when such long articles are positioned horizontally, cross-wise or longitudinally on the carts there is danger of knocking over adjacent merchandise or otherwise causing injury to persons or property in pushing the cart about. Moreover, the employment of racks, brackets or other projecting structures on carts of this kind seriously interferes with the compact nesting of the same required where space is of primary importance.

The present invention has for an important object the provision of a holding device which may be easily attached to shopping carts for releasable engagement with the handle of a long-handled implement to securely hold the same in an upright position on the cart and which does not interfere with the compact nesting of the carts in the usual way.

Another object of the invention is to provide a handle holder for shopping carts which may be applied to existing carts and which is movable to an extended position for engagement with a handled implement to hold the same in an upright position and to a retracted position to permit the horizontal nesting of the carts without interference by the holders.

A further object of the invention is the provision in a holding device of the kind referred to of means on the device positioned for engagement with the handle of an implement when the handle is in the holder to hold the handle against tilting movement out of an upright position.

A still further object of the invention is to provide a holder of the type mentioned for releasably holding a handled implement in an upright position on a shopping cart, which is of simple design and rugged construction, economical to manufacture and which is easily applied to or removed from a cart.

The above and other important objects and advantages of the invention may best be understood from the following detailed description, constituting a specification of the same when considered in conjunction with the annexed drawings, wherein:

FIGURE 1 is a fragmentary, side elevational view partly in cross-section, illustrating a preferred embodiment of the invention and showing the same in use for holding a handled implement in an upright position on a shopping cart;

FIGURE 2 is a view similar to that of FIGURE 1 showing the holder in its out-of-use retracted position;

FIGURE 3 is a side elevational view, on an enlarged scale, of the body of the holder, showing details of structure of the same; and FIGURE 4 is an elevational view of the body of the holder looking at the right hand side of the same as illustrated in FIGURE 3.

Referring now to the drawings in greater detail, the holder of the invention is illustrated herein in connection with its use on shopping carts of the type commonly used in super-markets and grocery stores, which carts are usually of the basket type, formed of a coarse mesh of heavy wire, having horizontal and vertical wires, such as those designated 10 and 12, respectively, one such horizontal wire usually extending about the open top of the basket. The holder of the invention comprises a generally plate-like body, generally designated 14, having a main planar portion 16 and an end flange 18, extending substantially at right angles to the planar portion. The main portion 16 of the body is provided with a central notch or slot 20, which is open at one side thereof, and which terminates inwardly in a somewhat enlarged circular opening 22 located centrally through the main portion. The main portion 16 carries a U-shaped element 24, attached to its lower face, the bottom 26 of the element being in contact with the lower face of the main portion, and secured thereto, in any convenient manner, as by spot welding, as indicated at 28, and the arms 30 of the U extended downwardly away from the main portion. The U-shaped element 24 is located substantially midway between the sides of the body, outwardly from the central opening 22.

A pair of spaced apart angle clips 32 are attached to the inner face of the flange 18, by one arm of the angle, as by means of welding, or otherwise, with the other arm of the angle extending inwardly away from the flange in spaced relation to the main portion 16. The main portion of the body is also provided with a small hole 34, near its free end, for the attachment thereto of one end of a coil spring 36, having at its other end a hook 38.

The holder is attached to the cart, preferably at the front end of the cart by hooking the body onto the uppermost horizontal wire of the basket, with the wire extending between the free arms of the clips 32 and the main portion 16 in contact with the inner face of the flange 18, as best seen in FIGURE 1, so that the body is pivotably supported on the basket for vertical swinging movement to a elevated position, shown in FIGURE 1, and to a substantially vertical retracted position, shown in FIGURE 3. The free arms of the clips 32 may be bent toward the main portion 16 to prevent the removal of the body from the basket.

With the body thus pivotally attached to the basket the hook portion 38 of the spring 36 may be hooked over a lower one of the horizontal wires 10 to position the spring to coact with the body to urge the body toward its retracted position, as shown in FIGURE 3.

In making use of the holder, constructed and applied to the shopping cart in the manner described above, the body 14 of the holder may be lifted to its substantially horizontal elevated position against the pull of the spring 36, and with the holder thus elevated the handle H of an implement such as a mop, broom or the like, may be inserted through the notch or slot 30 into the central opening 32, with the handle in an upright position, whereupon, upon releasing of the body the body will swing downwardly slightly under the pull of spring 36 to cause the handle to be gripped in the opening 22 to hold the handle securely in an upright position on the cart as clearly seen in FIGURE 1. It will be apparent that with the handle thus held that the arms 30 of the element 24 will be located on opposite sides of the handle H in position for engagement with the same to hold the handle against tilting movement out of its upright position.

When it is desired to release the handle from the holder, the body may be lifted slightly upwardly out of clamping engagement with the handle to allow the handle to be removed from the central opening 22 through the slot 20, and when the handle has been thus removed from the holder the spring 36 will pull the holder down to its retracted position as shown in FIGURE 3, so that the holder does not interfere with the horizontal nesting of the carts.

It will thus be seen that the invention provides a holder for handled implements which may be easily attached to shopping carts, by which various elongated objects may be held in an upright position on the cart, so that they do not interfere with the normal use of the cart in narrow aisles or other congested locations, while at the same time the holder does not interfere with the horizontal nesting of the shopping carts in the usual manner when not in use.

The invention is disclosed herein in connection with a certain specific embodiment of the same but it will be understood that this is intended by way of illustration only, and that various changes can be made in the construction and arrangement of the parts, within the spirit of the invention and the scope of the appended claims.

Having thus clearly shown and described the invention what is claimed as new and desired to secure by Letters Patent is:

1. In a holder for use on a shopping cart to hold a handled implement in an upright position thereon a plate-like body having a central opening therethrough and a slot through which a handle may be inserted to position the handle to extend through the opening, means for supporting the body on a shopping cart for vertical swinging movement into and out of a substantially horizontal plane externally of the cart to position the body for the insertion of a handle in an upright position through the slot into the horizontal position to engage the body with the handle in the opening to hold the handle upright, and means on the body positioned for engagement with the handle upon such downward movement of the body with the handle in the opening to hold the handle against tilting movement away from said upright position.

2. In a holder for use on a shopping cart to hold a handled implement in an upright position thereon a plate-like body having a central opening therethrough and a slot through which a handle may be inserted to position the handle to extend through the opening, means for supporting the body on a shopping cart for vertical swinging movement into and out of a substantially horizontal plane externally of the cart to position the body for the insertion of a handle in an upright position through the slot into the opening, said body being movable downwardly away from said horizontal position to engage the body with the handle in the opening to hold the handle upright, and yieldable means positioned for coaction with the cart and body to yieldingly resist upward swinging movement of the body.

3. In a holder for use on a shopping cart formed with vertically spaced, horizontal wires to hold a handled implement in an external, upright position on the cart, a body having a flat main portion formed with a central opening and a slot through which a handle may be inserted to position the handle to extend through the opening, means for supporting the body on the cart for vertical swinging movement with the slot extending parallel to an upper one of said wires into and out of a position with said main portion extending horizontally externally of the cart to allow a handle to be inserted in a vertical position through the slot into the opening, said body being movable downwardly away from said horizontal position to grippingly engage the body with the handle at opposite edge portions of said opening to hold the handle upright, and means on said body positioned for engagement with the handle at opposite locations thereon upon such downward movement of the body with the handle in the opening to hold the handle against tilting movement away from said vertical position.

4. In a holder for use on a shopping cart formed with vertically spaced, horizontal wires to hold a handled implement in an external, upright position on the cart, a body having a flat main portion formed with a central opening and a slot through which a handle may be inserted to position the handle to extend through the opening, means for supporting the body on the cart for vertical swinging movement with the slot extending parallel to an upper one of said wires into and out of a position with said main portion extending horizontally externally of the cart to allow a handle to be inserted in a vertical position through the slot into the opening, said body being movable downwardly away from said horizontal position to grippingly engage the body with the handle at opposite edge portions of said opening to hold the handle upright, and yieldable means positioned for coaction with the body and a lower one of said wires to yieldingly resist upward movement of the body.

References Cited in the file of this patent

UNITED STATES PATENTS

| 2,557,694 | Sagen | June 19, 1951 |
| 2,898,657 | Longfellow | Aug. 11, 1959 |
| 2,941,769 | Alpard | June 21, 1960 |

FOREIGN PATENTS

| 1,073,256 | France | Mar. 17, 1954 |